United States Patent [19]
Winfree

[11] 3,771,827
[45] Nov. 13, 1973

[54] COMBINATION BICYCLE SEAT

[76] Inventor: Virginia R. Winfree, 321 Rutledge Dr., S. Datona, Fla. 32019

[22] Filed: June 11, 1971

[21] Appl. No.: 152,157

[52] U.S. Cl.................................. 297/192, 297/195
[51] Int. Cl............................................. B62j 1/00
[58] Field of Search.................... 297/188, 194, 192, 297/195

[56] References Cited
UNITED STATES PATENTS

| | | | |
|---|---|---|---|
| 3,588,171 | 6/1971 | Rich, Jr. | 297/195 |
| 2,879,835 | 3/1959 | Miller | 297/194 X |
| 3,560,047 | 2/1971 | Davis | 297/188 |
| 3,232,686 | 2/1966 | Syler | 297/192 X |

FOREIGN PATENTS OR APPLICATIONS 1,142,015   3/1957   France............................. 297/188

*Primary Examiner*—James T. McCall
*Attorney*—John C. LaPrade

[57] ABSTRACT

The bicycle seat of this invention comprises a seating arrangement that includes structure defining a compartment that may be used to house a radio. In one embodiment a two-piece seat is provided with radio housing structure between and within the two piece seat.

4 Claims, 7 Drawing Figures

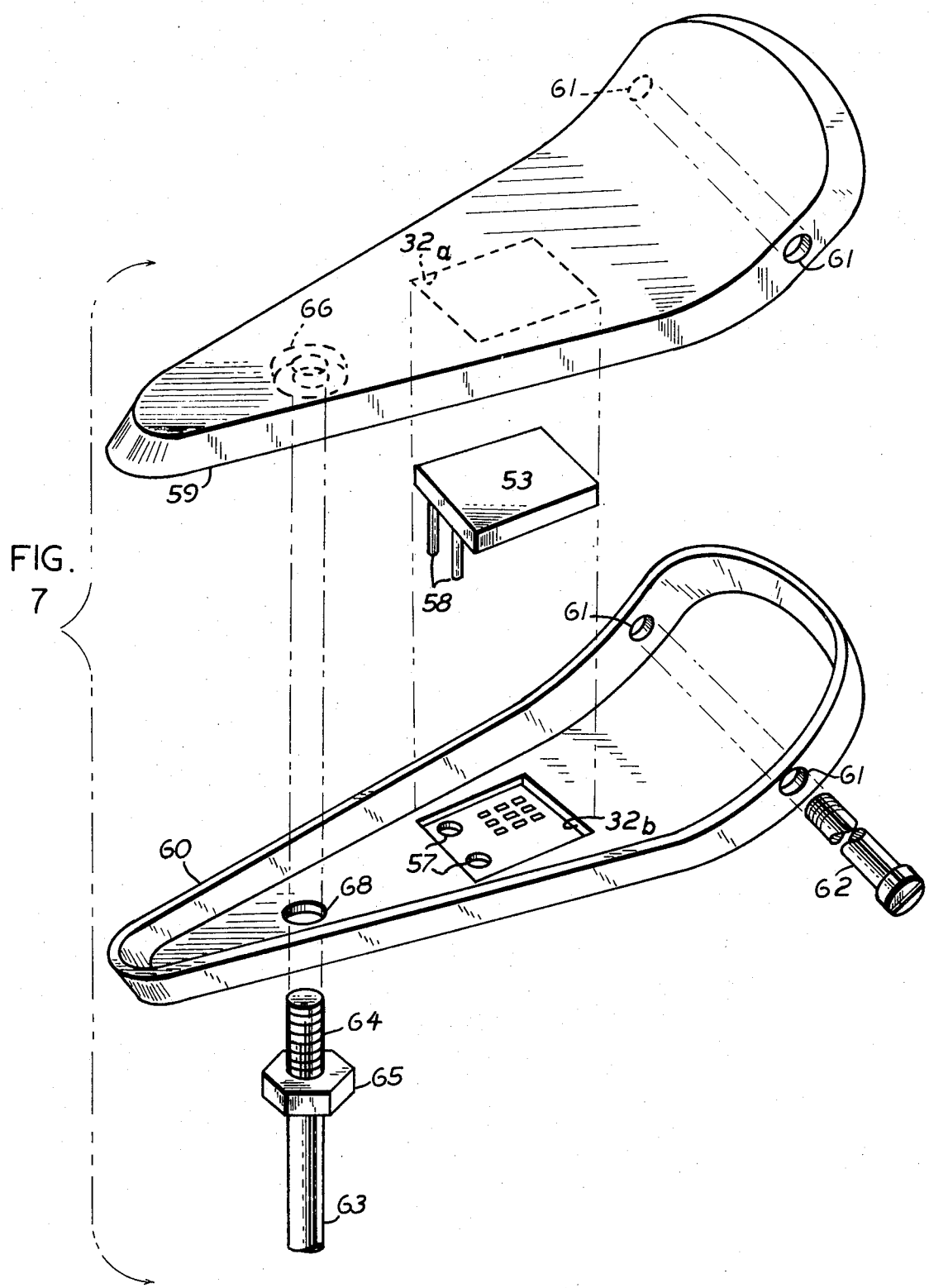

COMBINATION BICYCLE SEAT

BACKGROUND OF THE INVENTION

This invention relates to a seat for a conventional bicycle that has necessary structural provisions for a radio compartment. In one embodiment a transistorized or battery powered radio is located in the compartment.

It has been the usual practice of people, particularly children, who desired to ride a bicycle and have music to entertain them simultaneously, would hold a transistorized or battery operated radio in one hand while holding one handle of the handle bars with the other. It can be seen that this is an extremely dangerous and unsatisfactory practice that could and would be eliminated by the instant invention.

Another practice that has prevailed among the bicycling public has been that of tying a battery operated or other portable radio to the handle bars, baggage rack or other frame member of the bicycle. This practice leads to a loss of radios through theft as the radios are not protected in any manner. In addition the practice of tying a radio to bicycle from members has also caused considerable damage to them because of shock and vibration. The instant invention solves these problems of the prior art in that great protection to the radio is provided by the structural features of the compartment. It should also be pointed out that bicycle seats on the commercial market have not been provided with compartments that are capable of storage of small articles. The compartment structure of the instant invention may be used to provide storage of any small articles in a bicycle seat and to provide protection to such article particularly from theft, vibration and shock.

SUMMARY OF THE INVENTION

The combination bicycle seat of this invention comprises a one or two piece seat structure with a secure and safe compartment therein or secured thereto that can be used to house and protect a portable radio or other small object.

In one embodiment, a one-piece structural seat is provided with a compartment for attachment to the base of the one-piece seat member. In this embodiment one or more openings may be provided in the base or sides of the compartment through which radio controls or other objects may be extended. In one embodiment of the invention a two section bicycle seat structure is provided. In this embodiment a recessed opening comprising a compartment capable of housing a portable radio or other device is provided in the top section, the bottom section or both sections to house a radio or other device. In this embodiment where each section is essentially congruent with the other the means for fastening the sections together provides some protection to the radio or other device located in the compartment.

OBJECTS OF THE INVENTION

It is one object of this invention to provide a bicycle seat with compartment therein.

It is an additional object of this invention to describe and claim a bicycle seat with a compartment for housing a portable radio and having means to protect the radio.

It is also an object of the instant invention to disclose and claim a two-section bicycle seat with a compartment located between the sections.

It is one further object of this invention to provide a two-section bicycle seat with an encasing compartment that is easy to assemble and disassemble.

It is one further object of this invention to provide a bicycle seat with a substantially weatherproof radio compartment therein that gives considerable protection to the radio.

It is also one additional object of this invention to provide a bicycle seat with a built-in compartment for a radio or other object that offers protection against theft of the radio or other object contained therein.

BRIEF DESCRIPTION OF THE DRAWINGS

Several embodiment of the present invention are illustrated in the accompanying drawings wherein:

FIG. 7 is a perspective view of the two-section seat as assembled.

DESCRIPTION OF THE PREFERRED EMBODIMENTS

Figure 1:
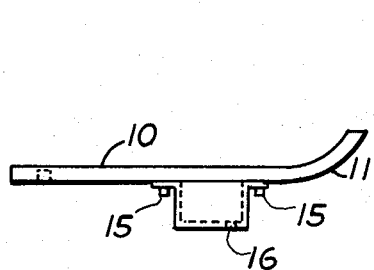
FIG. 1 is a side elevation of the single section seat and attached compartment.
Figure 2:
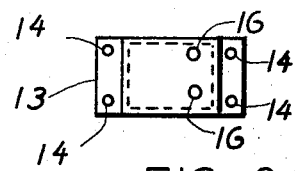
FIG. 2 is a top view of the compartment of this invention.

In FIG. 1, a conventional one-piece bicycle seat 10 is illustrated with a base thereof 11. On the base of the seat 11 a four sided container or compartment 12 is mounted. The compartment 12 may be fitted with a pair of flanges 13 on either end or either side to aid in mounting the compartment on the base of the seat. The flanges 13 have a plurality of openings therein 14 through which screws or equivalent fastening devices may be extended. For example, as illustrated in FIG. 2 four holes or openings 14 are provided for four screws 15 that may be used to mount compartment 12 on the base 11 of seat 10. The screws 15 may be seated into threaded plastic of metal receivers, not shown in the base of seat 11 or other conventional openings may be provided in the base 11 of seat 10.

Figure 6:
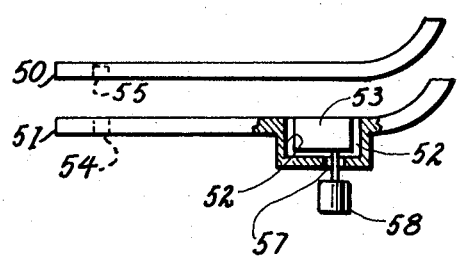
FIG. 6 is an exploded assembly view of FIG. 5 with a radio mounted in the compartment.

A pair of holes 16 may be provided in the base of the compartment. Radio control knobs 58 as illustrated in FIG. 6 may be extended through holes or openings 16. Additional opening, not shown may be provided in the base or side walls of the compartment 12 to allow sound waves to exit from the compartment.

Any compartment shown in any figure of the drawings may be lined with suitable insulation material to aid in protecting a portable radio or other object in the compartment. For example styrofoam or other foamed plastic may be used as insulation.

Figure 3:
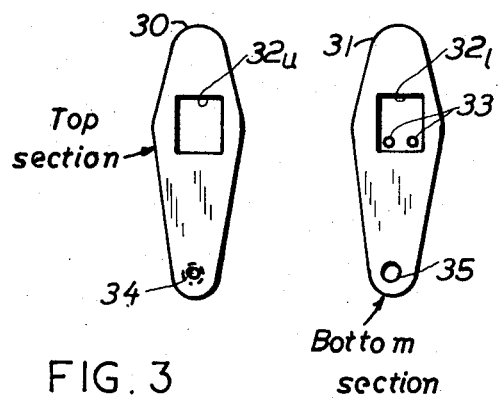
FIG. 3 is a plan view of the upper and lower sections of the two-piece seat of the invention where part of the compartment is located in each section.
Figure 4:
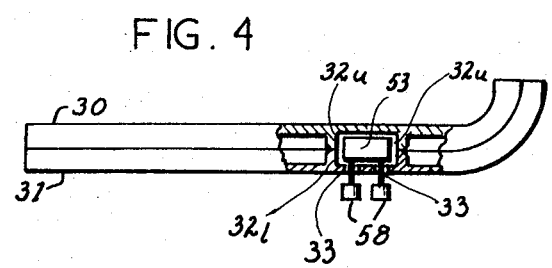
FIG. 4 is an assembly view.

In FIG. 3 and 4 a two-section bicycle seat assembly is illustrated with part of the compartment of this invention being formed in a recessed opening in each section. An upper section or plate 30 has a recessed opening on its bottom side $32_u$. This recessed opening 32 is of sufficient depth to accommodate and house about one-half to two-thirds of the thickness of a small portable transistorized radio. A suitable threated receptacle 34 is also provided on the bottom of upper seat section 30 into which a threaded seat post or other support member may be secured. Lower section 31 of the seat likewise has a corresponding recessed opening 32$_l$ into which a portable radio may be secured. At the base or bottom of the opening a pair of holes 16 may be provided to allow the extension of radio knobs therethrough. The periferal edges of each seat member 30 and 31 may be equipped with skirt members as best illustrated in FIG. 7. The upper seat section 30 will usually have a skirt member 59 depending from its outer periferal edge extended toward the lower seat section 31. The lower section 31 will likewise have a skirt member 60 extended from its peripheral edge extended toward the upper seat section 30. The two skirts will be of suitable size and dimensions to allow one to fit inside the other when the two-sections 30 and 31 are assembled. In the usual arrangement the depending skirt 59 will fit around skirt 60 so as to form a smooth interlocking arrangement. The lower seat section 31 has an opening 35 through which the seat post or rod 63 may be positioned. Opening 35 may be equipped with threads so that lower seat section may be threaded on post 63 if desired. Openings 33 may be located so as to allow the extension of control knobs therethrough.

In FIG. 4 the assembled upper and lower seat sections 30 and 31 are illustrated with the compartment being defined by 32$_u$ and 32$_l$ being located within and between the two sections.

Figure 5:
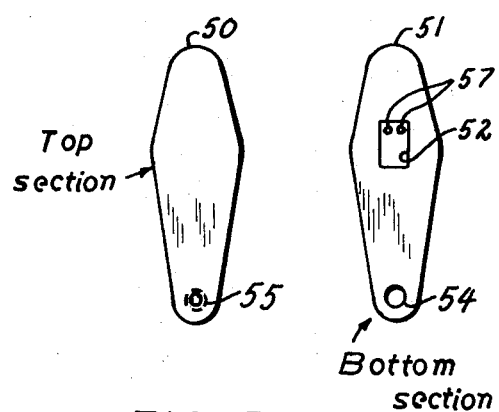
FIG. 5 is a plan view of the upper and lower sections of the two-piece seat wherein the compartment is located in a recess in the bottom section.

In FIG. 5 the upper seat section 50 is essentially flat no recessed opening therein. This upper seat section 50, that has a threaded member 55 in the base thereof as one means of fastening to the seat post 63 functions as a seat and as a cover for the recessed compartment 52 in the bottom section 51. The base of section 50 as well as the interior of compartment 52 may be covered with an insulation material such as a foam laminate or other padding material that may be used to protect a radio or other device in the compartment 52 from shock or vibration.

FIG. 6 is an assembly of the two-sections 50 and 51 showing the compartment 52 being located in the lower section 51. In addition to the openings 57 for the extension of the control knobs 58 a grill or other suitable openings may be provided to allow transmission of the sound waves from a radio.

In FIG. 7 a seat post 63 or support may be first fitted with a threaded on lock nut 65 that supports the lower seat section 31. In this embodiment opening 54 is not threaded and merely slips around post 63. A metal or plastic threaded insert 66 is provided in the bottom of top section 30 and is threaded on threads 64 on the end of post 63. Openings 61 in the rear of each skirt band accommodate a rod 62 that may be used as additional support for the seat assembly.

The rod or pin 62 may be replaced by a pair of bolts with nuts if desired. The reference numerals 32$_a$ and 32$_b$ define the compartment and 68 illustrates the opening of the post in section 31.

Other variations and usefull and equivalent embodiments of this invention will occur to those having skill in the art without departing from applicant's inventive concept.

I claim:

1. A bicycle seat comprising top and bottom sections, with compartment means located between, said top section having a depending flange around at least a portion of the periphery thereof, said bottom section having an ascending flange extending around at least a portion of the periphery thereof, wherein each of said flanges are adapted to be fitted together, rod means connected to said seat, means for connecting said top and bottom section to a bicycle, wherein the said compartment is adapted to house on radio.

2. The bicycle seat of claim 1 where the compartment means is formed by providing a recessed opening in the lower seat section.

3. The bicycle seat of claim 1 wherein openings are provided in one wall of the compartment to allow for extension of radio controls through the said wall.

4. The bicycle seat of claim 1 wherein the compartment is insulated to reduce shock and vibration to any article secured therein.

* * * * *